United States Patent [19]
Haak et al.

[11] Patent Number: 4,842,015
[45] Date of Patent: Jun. 27, 1989

[54] CHECK VALVE

[75] Inventors: Wilhelm Haak, Wennigsen; Peter Schiwik, Hanover; Gerd Röver, Wennigsen, all of Fed. Rep. of Germany

[73] Assignee: WABCO Westinghouse Fahrzeugbremsen GmbH, Hanover, Fed. Rep. of Germany

[21] Appl. No.: 191,634

[22] Filed: May 9, 1988

[30] Foreign Application Priority Data

Sep. 24, 1987 [DE] Fed. Rep. of Germany ....... 3732077

[51] Int. Cl.⁴ .............................................. F16K 15/02
[52] U.S. Cl. .................................. 137/543.23; 137/535
[58] Field of Search ........................... 137/535, 543.23

[56] References Cited

U.S. PATENT DOCUMENTS

| 322,084 | 7/1885 | Wilder | 137/535 |
| 627,390 | 6/1899 | Cash | 137/535 |
| 2,547,882 | 4/1951 | Norton | 137/535 |
| 2,873,760 | 2/1959 | Safford | 137/543.23 X |

FOREIGN PATENT DOCUMENTS

| 1675425 | 12/1970 | Fed. Rep. of Germany . |
| 68228429.6 | 6/1985 | Fed. Rep. of Germany . |
| 846944 | 9/1960 | United Kingdom . |
| 1579512 | 11/1980 | United Kingdom . |

*Primary Examiner*—John Rivell
*Attorney, Agent, or Firm*—J. O. Ray, Jr.

[57] ABSTRACT

A check valve assembly in which a valve spring is positioned with respect to the valve body in a manner such that the deformation line of such valve spring is one of offset and inclined in relation to the longitudinal axis of the valve body so that one side of such valve body is pressed against a guide provided for such valve body while the inlet valve is in an open position. The valve body of the check valve is prestressed against a valve seat by the valve spring.

16 Claims, 2 Drawing Sheets

U.S. Patent  Jun. 27, 1989  Sheet 1 of 2  4,842,015
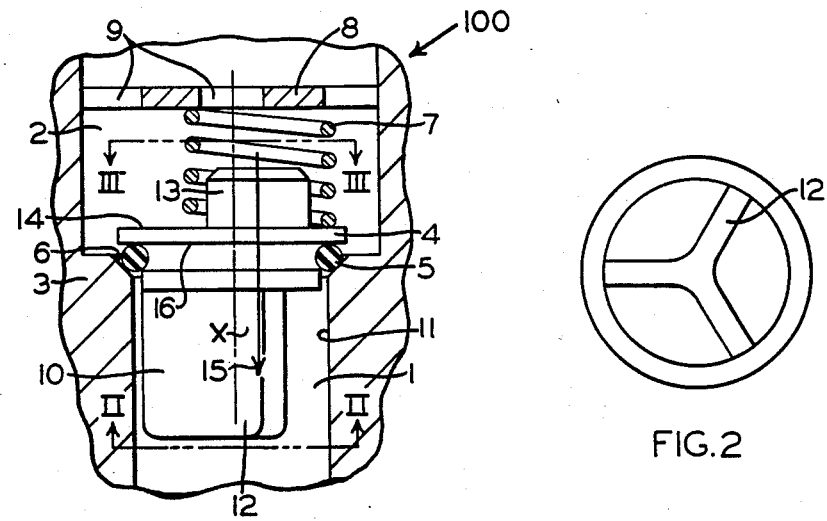
FIG.1
FIG.2
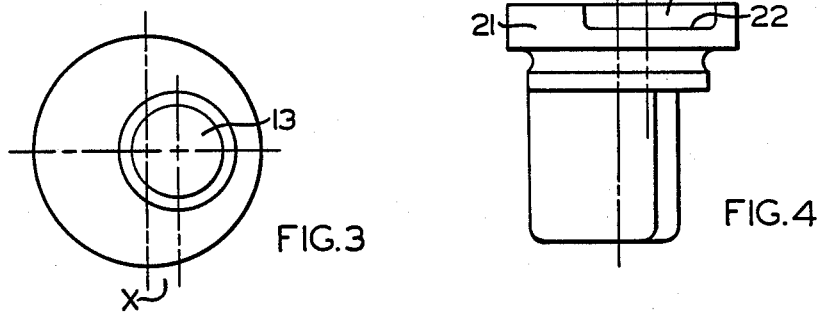
FIG.3
FIG.4
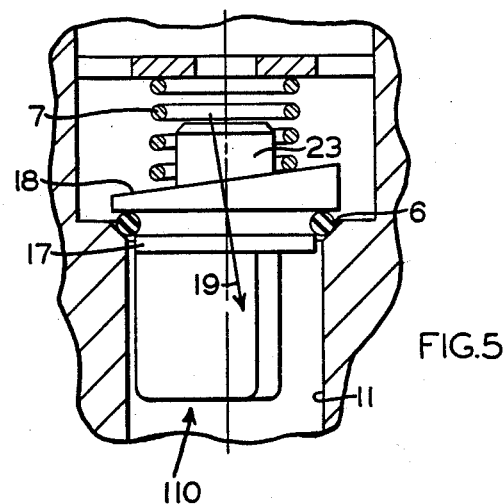
FIG.5

CHECK VALVE

FIELD OF THE INVENTION

The present invention relates, in general, to check valves and, more particularly, this invention relates to a check valve for use in a fluid pressure application, especially pressurized air.

BACKGROUND OF THE INVENTION

Prior to the present invention, a check valve of this kind has been taught in the prior art. This check valve serves the purpose of assuring the user that pressurized pipes are not inadvertently emptied of pressurized fluid. The pressure medium is expected to flow in only one direction. In many applications, the pressure medium is prevented from being recirculated by the check valve which automatically closes the inlet when the pressure in the feed line decreases. When the pressure increases in the feed line, the spring in the check valve permits the opening of the inlet so that an equilibrium of pressure can be established in the pressurized pipes.

Depending on the particular operational conditions of the system, flowing media may carry impurities through the piping. These impurities in the media may lead to the occurrence of detrimental deposits at points where the flow behavior is impaired, such as in the labyrinth of a check valve. Such deposits in the check valve can lead to the failure of moving valve components. The conventional method used in the prior art for trying to prevent this phenomenon consists of constructing the check valve in such a way that the bearings and guides of the moving valve components, as for example, those of the valve body of the check valve mentioned above, are fitted with as much play as is feasibly possible.

The primary advantage of the decrease in the susceptance to failure of the check valve which has been achieved by the designing of the play in such check valve as described above is, however, accompanied by the significant disadvantage that unavoidable swirling of the media flowing through the check valve labyrinth, along with the elasticity of the valve spring, by its effect on the valve body, can easily cause the valve body to oscillate in a detrimental manner. In addition, this usually results in undesirable valve noises, which can assume differing pitch of differing intensity. These valve noises depend, to a large extent, on the oscillation frequency of the check valve, the flow rate of the media through such check valve, and the particular shape of the interior of the housing of such check valve.

SUMMARY OF THE INVENTION

The present invention provides a check valve particularly suited for use in a fluid pressure system, and especially one utilizing pressurized air. The check valve includes an inlet valve portion. This inlet valve portion of the check valve is formed by a valve seat and the valve body. A guide means is provided in the check valve for guiding the valve body or an extension connected to and protruding from such valve body. The check valve also includes a valve spring which acts on the valve body in a manner such that the valve body will be prestressed against such valve body. This valve spring is installed in relationship to the valve body in a manner such that the point of impact on the valve body by the deformation line of the valve spring is offset in relation to the point of impact on the valve body by the resultant force of the pressure medium. If desired, the deformation line of the valve spring can be positioned and constructed in a manner such that the valve body and/or the extension protruding from such valve body, respectively, are pressed against the guide means when the inlet valve is in an opening position, while the exerting force generated in the process is greater than that exerted when the inlet valve is in a closing position.

OBJECTS OF THE INVENTION

It is, therefore, one of the primary objects of the present invention to provide an improved check valve which, by relatively simple means, can substantially eliminate the undesirable valve noises caused by an oscillation or vibration of the valve body while simultaneously maintaining a relatively large play for the movable valve components of such check valve.

Another object of the present invention is to provide an improved check valve that does not require costly flow-promoting construction of the valve components and of the interior of the check valve housing for the purpose of reducing the undesirable swirling action of the flowing pressure medium.

Still another object of the present invention is to provide an improved check valve that minimizes the number of failure-prone valve components required to produce such check valve.

Yet another object of the present invention is to provide an improved check valve that it is relatively simple in design.

A further object of the present invention is to provide an improved check valve in which certain useful components thereof can be incorporated into existing check valves is that of relatively low cost.

In addition to the above-described objects and advantages of the present invention, various other objects and advantages of this invention will become more readily apparent to those persons who are skilled in the valve art from the following more detailed description of this invention, when such description is taken in conjunction with the attached drawing FIGURES and with the appended claims.

BRIEF DESCRIPTION OF THE DRAWINGS

FIG. 1 is a fragmented side elevational view, partially in cross-section, which illustrates a check valve constructed according to a presently preferred embodiment of the invention, in which the deformation line of the valve spring is offset in relation to the point of impact on the valve body by the force exerted by the pressure medium;

FIG. 2 is a view taken along lines II—II of FIG. 1, which illustrates one portion of the valve body of the check valve;

FIG. 3 is a view taken along lines III—III of FIG. 1, which illustrates a second portion of the valve body of the check valve;

FIG. 4 is a side elevational view illustrating the valve body shown in FIG. 1;

FIG. 5 is a fragmented side elevational view, partially in cross-section, which illustrates an alternative embodiment of a check valve constructed according to the present invention, in which the deformation line of the valve spring is on an incline with respect to the point of impact on the valve body by the resulting force exerted by a pressure medium flowing through such check valve;

BRIEF DESCRIPTION OF THE INVENTION

Figure 6:
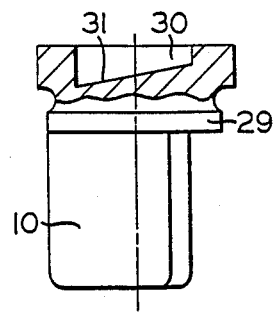
FIG. 6 is a side elevational view that is partially in cross-section, which illustrates that valve body in the check valve illustrated in FIG. 5.

Prior to proceeding to the more detailed description of the check valve of the present invention, it should be noted that throughout the numerous views illustrated in the drawings, identical reference numerals have been used to identify identical elements for the sake of clarity.

Now refer more particularly to FIG. 1 which illustrates a check valve, generally designated 100, constructed according to a presently preferred embodiment of the invention. The check valve 100 is in a feed line having a supply line 1 and a discharge line 2 for the flow of a pressurized medium, such as, compressed air. Both the supply line 1 and the discharge line 2 are connected to the valve housing, indicated at 3 in FIG. 1. A valve body 4 having a seal 5 in conjunction with a valve seat 6 formed on the valve housing 3 combines to form an inlet valve 4, 6. Alternatively, the seal 5 may be connected to the valve seat 6 portion instead of to the valve body 4. This alternative arrangement of the seal 5 has not been illustrated in the drawings, but it is believed understandable by those skilled in the art. It is also possible to provide either the valve body 4 or the valve seat 6 with a sealing surface having a special shape such that the seal 5 can be eliminated entirely.

A valve spring 7 is installed downstream between the valve body 4 and a wall of the valve housing 3. The wall is designed and manufactured as a valve catch 8. Such valve catch 8 includes at least one perforation 9 which allows the pressure medium to flow therethrough. The valve body 4 is prestressed against the valve seat 6 by the force that is exerted by the valve spring 7 which is supported on one end thereof by the valve catch 8.

The valve body 4 is preferably equipped with an extension 10 which is located opposite the valve spring 7 and protrudes into the supply channel through which the pressure medium flows. The wall of the supply channel 1, or a portion thereof, by means of the extension 10, serves as a guide surface 11 for the valve body 4, in which the valve body 4 is held in the flow direction during the time the inlet valve 4, 6 is being opened and closed. The extension 10 is preferably equipped with protrusions 12 which are suitably constructed in such a way that the passage of the supply channel 1 is not reduced more than required with the guide means given.

Depending upon the operational conditions under which the check valve 100 must operate in a particular pressurized system, it is also conceivable to provide the valve body 4 with a predetermined number of additional protrusions located opposite the extension 10. Such additional protrusions would protrude into the discharge channel 3 where they would serve as an additional guide means for the valve body 4 in conjunction with the wall of the discharge channel 2.

The valve body 4 is equipped with a device for fastening the valve spring 7 in position in relation to the valve body 4. This device consists of a support surface 14 which is connected with the valve body 4 and installed opposite the valve spring 7. The device further has at least one protrusion 13 protruding from the support surface 14 into the valve spring 7.

Alternatively, the valve body 4 may be replaced by a valve body 21 according to FIG. 4. The alternative valve body 21 is provided with a cavity 20 into which the valve spring 7 protrudes and the bottom of which serves as a support surface 22 for the valve spring 7.

In either case, the protrusion 13 or the cavity 20 is located at a predetermined distance (x) excentrically to the longitudinal axis of the valve body 4. The valve spring 7 which, therefore, is in the same way excentrical to the longitudinal axis of the valve body 4, causes the deformation line 15 of the valve spring 7 to be offset by the distance (x) named above in relation to the point of impact on the valve body 4 by the resulting force exerted by the pressure medium. (See FIGS. 1, 3, and 4).

When the inlet valve 4, 6 opens, the opening pressure of the pressure medium exerts a force on an impact surface 16 of the valve body 4.

The point of impact on the valve body 4 by the resulting force exerted by the pressure medium is opposed by the deformation line 15 of the valve spring 7, offset by the distance (x).

By means of a predetermined torque, which is directed at the valve body 4 by the distance of (x), the valve body 4 is pressed against the guide surface 11 and held in this position during the time this inlet valve 4, 6 is in an open position. In this manner, the possible generation of a natural frequency occurring in the valve body 4, as a result of the influences discussed above, is substantially impeded.

In contrast to the embodiment of the invention illustrated in FIG. 1, the check valve, generally designated 110, illustrated in FIG. 5, has the valve spring 7 installed concentrically to the longitudinal axis of the valve body 17. In this arrangement of the check valve 110, the valve spring 7 is supported by a support surface 18 which is inclined in relation to the longitudinal direction of such valve body 17, so that the deformation line 19 is inclined in relation to the resulting force exerted by the pressure medium.

When the inlet valve 17, 6 is opened, one side of the valve body 17 is pressed against the guide surface 11. This is brought about by a force component of the deformation line 19 that is oriented toward the guide surface 11 and by the opening pressure of the pressure medium acting on the valve body 17.

When the pressurization by the pressure medium ceases, the force of the valve spring 7 is left as the only force being exerted on the valve body 4, 17, 21. In this manner, the contact pressure which is effective between the valve body 4, 17, 21 and the guide surface 11 is reduced. Thereafter, the valve body 4, 17, 21 can be moved into the closed position of the inlet valve 4, 6; 17,6; 21,6, by the valve spring 7.

Now refer to FIG. 6, which shows a valve body 219 containing a cavity 30 for fastening the valve spring 7 in its desired position. The cavity 30 is provided with a support surface 31, which is inclined in relation to the longitudinal direction of the valve body 29. A possible replacement of the valve body 17 by the alternative embodiment valve body 29 renders the same results.

Figure 7:
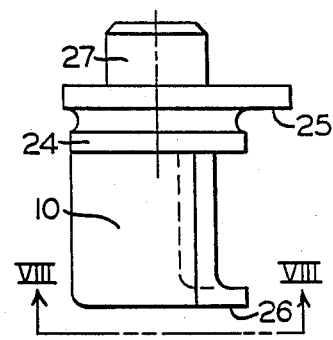
FIG. 7 is a side elevational view of an alternative embodiment of a valve body for use in a check valve constructed according to this invention.
Figure 8:
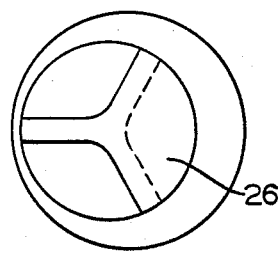
FIG. 8 is an end view taken along the lines VIII—VIII of FIG. 7.
Figure 9:
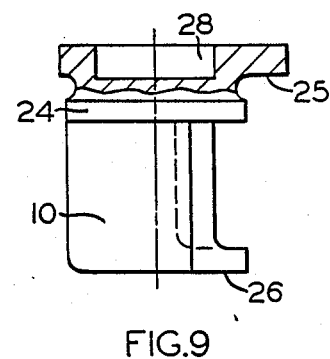
FIG. 9 is a side elevational view, partially in cross-section, of the valve body illustrated in FIG. 7.

FIGS. 7, 8 and 9 show a valve body 24 with an impact surface 25 arranged concentrically to the point of impact of the resulting force exerted by the pressure medium, which is directed at the valve body 24. In the area of the extreme end of its extension 10, the valve body 24 is provided with a surface 26 which faces the pressure medium and is arranged in relation to the impact surface 25 in the same direction excentrically to the point of impact on the valve body 24 by such resulting force exerted by the pressure medium. The guide means are provided in the shape of at least one protrusion 27 or one cavity 28 by means of which the valve spring 7 is installed in relation to the valve body 24 in such a way that its deformation line is inclined in relation to the point of impact of the resulting force exerted by the pressure medium while the inlet valve 24, 6 is in an open position.

When the inlet valve 24, 6 is in the open position, the valve body 24 is abutted against the guide surface 11 and held in this position by means of the deformation line of the valve spring 7, which is inclined in relation to the resulting force exerted by the pressure medium.

Although the presently preferred and a number of alternative embodiments of the check valve of the present invention have been illustrated in the drawings and described in detail above, it should be obvious to persons who are skilled in the valve art that various other modifications and adaptations of the check valve of the present invention can be made without departing from the spirit and scope of the appended claims.

We claim:

1. A check valve assembly to control a flow of a pressurized medium in a fluid pressure system, said check valve assembly comprising:
   (a) a housing member having a cavity therein, said cavity being in fluid communication with a source of fluid pressure at an inlet side thereof and being in fluid communication with a consuming source of said fluid pressure at an outlet side thereof;
   (b) an inlet valve formed by a valve seat positioned within said cavity and a valve body positioned within said cavity in a position to sealingly engage said valve seat when said check valve is in a closed position;
   (c) a valve body guide means positioned within said cavity for guiding said valve body during an opening and closing of said check valve, said valve body being pressed against said guide means when said inlet valve is undergoing said opening and a force generated by said pressurized medium is greater than that exerted by said presssurized medium when said check valve is closed; and
   (d) a valve spring engageable with said valve body to prestress said valve body against said valve seat when said check valve is closed, said valve spring being positioned in relationship to said valve body in a manner such that a point of impact on said valve body by a deformation line of said valve spring in relationship to said force generated by said pressurized medium is offset.

2. A check valve assembly, according to claim 1, wherein said valve spring is fastened to said valve body and said check valve assembly further includes:
   (a) a support surface on said valve body engageable by said valve spring; and
   (b) at least one protrusion protruding from said support surface and into said valve spring, said protrusion being located excentrically to said point of impact on said valve body by said force generated by said pressure medium.

3. A check valve assembly, according to claim 1, wherein said valve spring is fastened to said valve body and said check valve assembly further includes:
   (a) a fastening means engageable with said valve body and said valve spring for securing said valve spring to said valve body, said valve spring protruding into said fastening means and said fastening means being positioned excentrically to said point of impact on said valve body by said force generated by said pressure medium; and
   (b) a support surface formed adjacent a bottom portion of said fastening means for engagement with said valve spring.

4. A check valve assembly to control a flow of a pressurized medium in a fluid pressure system, said check valve assembly comprising:
   (a) a housing member having a cavity therein, said cavity being in fluid communication with a source of fluid pressure at an inlet side thereof and being in fluid communication with a consuming source of said fluid pressure at an outlet side thereof;
   (b) an inlet valve formed by a valve seat positioned within said cavity and a valve body positioned within said cavity in a position to sealingly engage said valve seat when said check valve is in a closed position;
   (c) an extension member connected to and protruding from said valve body;
   (d) a valve body guide means positioned within said cavity for guiding said valve body during an opening and closing of said check valve, one of said extension member and said valve body being pressed against said guide means when said inlet valve is undergoing said opening and a force generated by said pressurized medium is greater that that exerted by said pressurized medium when said check valve is closed; and
   (e) a valve spring engageable with said valve body to prestress said valve body against said valve seat when said check valve is closed, said valve apring being positioned in relationship to said valve body in a manner such that a point of impact on said valve body by a deformation line of said valve spring in relationship to said force generated by said pressurized medium is offset.

5. A check valve assembly, according to claim 4, wherein said extension is pressed against said guide means when said inlet valve is undergoing said opening and said force generated by said pressurized medium is greater than that exerted by said pressurized medium when said check valve is closed.

6. A check valve assembly, according to claim 4, wherein said valve body is pressed against said guide means when said inlet valve is undergoing said opening and said force generated by said pressurized medium is greater than that exerted by said pressurized medium when said check valve is closed.

7. A check valve assembly, according to claim 4, wherein said valve spring is fastened to said valve body and said check valve assembly further includes:
   (a) a support surface on said valve body engageable by said valve spring; and
   (b) at least one protrusion protruding from said support surface and into said valve spring, said protrusion being located excentrically to said point of impact on said valve body by said force generated by said pressure medium.

8. A check valve assembly, according to claim 4, wherein said valve spring is fastened to said valve body and said check valve assembly further includes:
  (a) a cavity formed in said valve body adjacent one end of said valve spring, said cavity being positioned excentrically to said point of impact on said valve body by said force generated by said pressure medium; and
  (b) a bottom surface of said cavity forming a support surface engageable by said valve spring.

9. A check valve assembly, according to claim 4, wherein said valve spring is fastened to said valve body and said check valve assembly further includes:
  (a) a fastening means engageable with said valve body and said valve spring for securing said valve spring to said valve body, said valve spring protruding into said fastening means and said fastening means being positioned excentrically to said point of impact on said valve body by said force generated by said pressure medium; and
  (b) a support surface formed adjacent a bottom portion of said fastening means for engagement with said valve spring.

10. A check valve assembly to control a flow of a pressurized medium in a fluid pressure system, said check valve assembly comprising:
  (a) a housing member having a cavity therein, said cavity being in fluid communication with a source of fluid pressure at an inlet side thereof and being in fluid communication with a consuming source of said fluid pressure at an outlet side thereof;
  (b) an inlet valve formed by a valve seat positioned within said cavity and a valve body positioned within said cavity in a position to sealingly engage said valve seat when said check valve is in a closed position;
  (c) a valve body guide means positioned within said cavity for guiding said valve body during an opening and closing of said check valve, said valve body being pressed against said guide means when said inlet valve is undergoing said opening and a force generated by said pressurized medium is greater than that exerted by said pressurized medium when said check valve is closed; and
  (d) a valve spring engageable with said valve body to prestress said valve body against said valve seat when said check valve is closed, said valve spring being positioned in relationship to said valve body in a manner such that a point of impact on said valve body by a deformation line of said valve spring in relationship to said force generated by said pressurized medium is inclined.

11. A check valve assembly, according to claim 10, wherein said valve spring is fastened to said valve body and said check valve assembly further includes:
  (a) a cavity formed in said valve body adjacent one end of said valve spring, said cavity being positioned excentrically to said point of impact on said valve body by said force generated by said pressure medium; and
  (b) a bottom surface of said cavity forming a support surface engageable by said valve spring.

12. A check valve assembly, according to claim 10, wherein said valve spring is fastened to said valve body and said check valve assembly further includes:
  (a) a support surface on said valve body engageable by said valve spring, said support surface being inclinded in relationship to a longitudinal direction of said valve body; and
  (b) at least one protrusion protruding from said support surface and into said valve spring, said protrusion being located concentrically to said point of impact in said valve body by said force generated by said pressure medium.

13. A check valve assembly, according to claim 10, wherein said valve spring is fastened to said valve body and said check valve assembly further includes:
  (a) a cavity formed in said valve body into which said valve spring protrudes, said cavity being centered with respect to said point of impact on said valve body by said force generated by said pressure medium; and
  (b) a support surface formed adjacent a bottom of said cavity to engage said valve spring, said support surface being inclined in relationship to a longitudinal direction of said valve body.

14. A check valve assembly to control a flow of a pressurized medium in a fluid pressure system, said check valve assembly comprising:
  (a) a housing member having a cavity therein, said cavity being in fluid communication with a source of fluid pressure at an inlet side thereof and being in fluid communication with a consuming source of said fluid pressure at an outlet side thereof;
  (b) an inlet valve formed by a valve seat positioned within said cavity and a valve body positioned within said cavity in a position to sealingly engage said valve seat when said check valve is in a closed position;
  (c) an extension member connected to and protruding from said valve body;
  (d) a valve body guide means positioned within said cavity for guiding said valve body during an opening and closing of said check valve, one of said extension member and said valve body being pressed against said guide means when said inlet valve is undergoing said opening and a force generated by said pressurized medium is greater than that exerted by said pressurized medium when said check valve is closed; and
  (e) a valve spring engagable with said valve body to prestress said valve body against said valve seat when said check valve is closed, said valve spring being positioned in relationship to said valve body in a manner such that a point of impact on said valve body by a deformation line of said valve spring in relationship to said force generated by said pressurized medium is inclined.

15. A check valve assembly, according to claim 14, wherein said valve spring is fastened to said valve body and said check valve assembly further includes:
  (a) a support surface on said valve body engageable by said valve spring, said support surface being inclined in relationship to a longitudinal direction of said valve body; and
  (b) at least one protrusion protruding from said support surface and into said valve spring, said protrusion being located concentrically to said point of impact in said valve body by said force generated by said pressure medium.

16. A check valve assembly, according to claim 14, wherein said valve spring is fastened to said valve body and said check valve assembly further includes:
  (a) a cavity formed in said valve body into which said valve spring protrudes, said cavity being centered with respect to said point of impact on said valve body by said force generated by said pressure medium; and
  (b) a support surface formed adjacent a bottom of said cavity to engage said valve spring, said support surface being inclined in relationship to a longitudinal direction of said valve body.

* * * * *

UNITED STATES PATENT AND TRADEMARK OFFICE
CERTIFICATE OF CORRECTION

PATENT NO. : 4,842,015
DATED : June 27, 1989
INVENTOR(S) : Wilhelm Haak, Peter Schiwik, and Gerd Rover It is certified that error appears in the above-identified patent and that said Letters Patent is hereby corrected as shown below:

Column 5, line 49, delete "presssurized" and insert

--pressurized--

Column 6, line 41, delete "apring" and insert --spring--

Signed and Sealed this

Twenty-third Day of April, 1991

Attest:

HARRY F. MANBECK, JR.

Attesting Officer

Commissioner of Patents and Trademarks